United States Patent
Chang et al.

(10) Patent No.: US 10,887,789 B2
(45) Date of Patent: Jan. 5, 2021

(54) FEEDBACK FOR RAN-ASSISTED RATE ADAPTATION

(71) Applicants: Kyocera Corporation, Kyoto (JP); Henry Chang, San Diego, CA (US); Masato Fujishiro, Yokohama (JP)

(72) Inventors: Henry Chang, San Diego, CA (US); Masato Fujishiro, Yokohama (JP)

(73) Assignee: Kyocera Corporation, Kyoto (JP)

( * ) Notice: Subject to any disclaimer, the term of this patent is extended or adjusted under 35 U.S.C. 154(b) by 0 days.

(21) Appl. No.: 16/346,980

(22) PCT Filed: Oct. 27, 2017

(86) PCT No.: PCT/US2017/058702
§ 371 (c)(1),
(2) Date: May 2, 2019

(87) PCT Pub. No.: WO2018/085140
PCT Pub. Date: May 11, 2018

(65) Prior Publication Data
US 2020/0059818 A1    Feb. 20, 2020

Related U.S. Application Data

(60) Provisional application No. 62/417,497, filed on Nov. 4, 2016.

(51) Int. Cl.
*H04W 28/02*    (2009.01)
*H04W 28/22*    (2009.01)
(Continued)

(52) U.S. Cl.
CPC ....... *H04W 28/0278* (2013.01); *H04W 28/22* (2013.01); *H04W 36/0022* (2013.01); *H04W 72/0413* (2013.01); *H04W 72/1284* (2013.01)

(58) Field of Classification Search
CPC ............ H04W 28/0278; H04W 28/22; H04W 36/0022; H04W 72/0413; H04W 72/1284
See application file for complete search history.

(56) References Cited

U.S. PATENT DOCUMENTS

| | | |
|---|---|---|
| 9,584,416 B2 | 2/2017 | Ho et al. |
| 2016/0226785 A1 | 8/2016 | Khay-Ibbat et al. |

FOREIGN PATENT DOCUMENTS

| | | |
|---|---|---|
| JP | 200284577 A | 3/2002 |
| JP | 2012-529860 A1 | 11/2012 |
| WO | 2010014484 A1 | 2/2010 |

OTHER PUBLICATIONS

3GPP; "3rd Generation Partnership Project; Technical Specification Group Radio Access Network Evolved Universal Terrestrial Radio Access (E-UTRA); Study on Voice and Video Enhancement for LTE (Release 14)", 3GPP TR 36.750 v. 1.0.0; Sep. 2016; Vaibonne, FR.

(Continued)

*Primary Examiner* — Brenda H Pham (57) ABSTRACT

A base station receives a bitrate query from a first user equipment (UE) device being served by the base station. The bitrate query can be a request for a bitrate increase or decrease. The base station transmits a bitrate recommendation to the first UE device. The bitrate recommendation is to be used for a Voice over Long-Term Evolution (VoLTE) call between the first UE device and a second UE device. In some instances, the first UE device and the second UE device negotiate the bitrate to be used for the VoLTE call, based on the bitrate recommended by the base station. The first and second UE devices implement a bitrate for the VoLTE call and provide feedback to the base station.

21 Claims, 4 Drawing Sheets

(51) Int. Cl.
*H04W 36/00* (2009.01)
*H04W 72/04* (2009.01)
*H04W 72/12* (2009.01)

(56) References Cited

OTHER PUBLICATIONS

Oppo; "Discussion on RAN bit rate recommendation procedure"; R2-166186, 3GPP TSG RAN WG2 #95bis; Sep. 30, 2016; Kaohsiung, TW.
Kyocera; "Details of RAN-assisted codec rate adaptation"; R2-166859, 3GPP TSG RAN WG2 #95bis; Sep. 30, 2016; Kaohsiung, TW.
Ericsson; "RAN assisted codec rate selection and adaptation"; R2-167082, 3GPP TSG RAN WG2 #95bis; Oct. 1, 2016; Kaohsiung, TW.
Intel Corporation; "RAN-based rate adaptation mechanism for VoLTE"; R2-166582, 3GPP TSG RAN WG2 #95bis; Oct. 1, 2016; Kaohsiung, TW.

FEEDBACK FOR RAN-ASSISTED RATE ADAPTATION

CLAIM OF PRIORITY

The present application claims priority to Provisional Application No. 62/417,497, entitled "FEEDBACK FOR RAN-ASSISTED CODEC RATE ADAPTATION", filed Nov. 4, 2016, assigned to the assignee hereof and hereby expressly incorporated by reference in its entirety.

FIELD

This invention generally relates to wireless communications and more particularly to rate adaptation in a radio access network.

BACKGROUND

3rd Generation Partnership Project (3GPP) specified a new voice codec named EVS (Enhanced Voice Services). A codec is a device or program that (1) encodes data for transmission and/or storage, and (2) decodes received data for playback, storage, and/or editing. EVS provides high voice quality over a wide range of rates, which allows the low EVS codec rates to still have sufficient quality, and may be used in poor coverage environments and overload scenarios. However, it is still desirable to use the higher codec rates for enhanced audio quality whenever possible. EVS has the flexibility, with a wider rate range and full audio bandwidth, to deliver speech quality that matches other audio inputs, such as stored music, while offering high robustness to delay, jitter, and packet losses.

Radio conditions may also impact the codec mode and codec rate. For example, under poor radio conditions, a lower codec rate may be used to reduce the packet loss, whereas a higher codec rate can be used in good radio conditions to ensure a better user experience. Therefore, a flexible and efficient codec modification mechanism is needed that accounts for the voice codec, network capacity, radio conditions, and user experience.

SUMMARY

A base station receives a bitrate query from a first user equipment (UE) device being served by the base station. The bitrate query can be a request for a bitrate increase or decrease. The base station transmits a bitrate recommendation to the first UE device. The bitrate recommendation is to be used for a Voice over Long-Term Evolution (VoLTE) call between the first UE device and a second UE device. In some instances, the first UE device and the second UE device negotiate the bitrate to be used for the VoLTE call, based on the bitrate recommended by the base station. The first and second UE devices implement a bitrate for the VoLTE call and provide feedback to the base station.

DETAILED DESCRIPTION

Voice-over-LTE (VoLTE) is a key feature for the 3GPP Long Term Evolution (LTE) communication specification to provide voice service and is being deployed and launched by operators all over the world, which makes VoLTE capability extremely important for operators. One of the critical factors that may impact the user experience of VoLTE service is the voice codec configuration. For example, a higher Adaptive Multi-Rate (AMR) voice code rate may provide a higher-definition voice call and accordingly a better user experience. When a higher AMR voice code rate is used, the higher codec rate requires more radio resource allocation, which implies less available network capacity.

The base station (e.g., eNB) of the Radio Access Network (RAN) is in the best position to trigger voice codec rate adaptation. Thus, an eNB-assisted (or RAN-assisted) codec rate adaptation solution should be considered. In order to support eNB-assisted codec rate adaptation, one of the main questions to consider is if the eNB needs to have the information on the specific codec rates for each type of supported codec. If we assume the eNB has specific information about the codec rates, we should also consider if the eNB would also need to know the codec type, the frame aggregation, the redundancy level, and the redundancy offset. This would imply the eNB could essentially serve as the end point for codec rate adaptation in place of the user equipment (UE) device.

However, if the eNB only has the codec rate information, it is unclear how much weight the UE device should give to the eNB's recommended codec rate as one of the inputs to the UE device's application layer. Note that traditionally eNBs do not handle any application layer signaling. Rather, they only handle the Access Stratum (AS) part of the LTE system. Adding application layer signaling within the eNB would drastically change the existing paradigm of how the network architecture is structured. Thus, the following examples describe techniques and system configurations that enable the eNB to facilitate rate adaptation despite not having codec rate information.

Moreover, as the UE device moves in and out of coverage, the eNB's selection of a recommended rate for the UE device should be a function of the UE device's radio condition and whether the recommended rate is applicable to the UE device when the UE device is handed over to a target eNB.

Although most of the examples discussed herein focus on VoLTE applications, any of the following examples may be modified for Video-over-LTE (ViLTE) applications.

Figure 1:
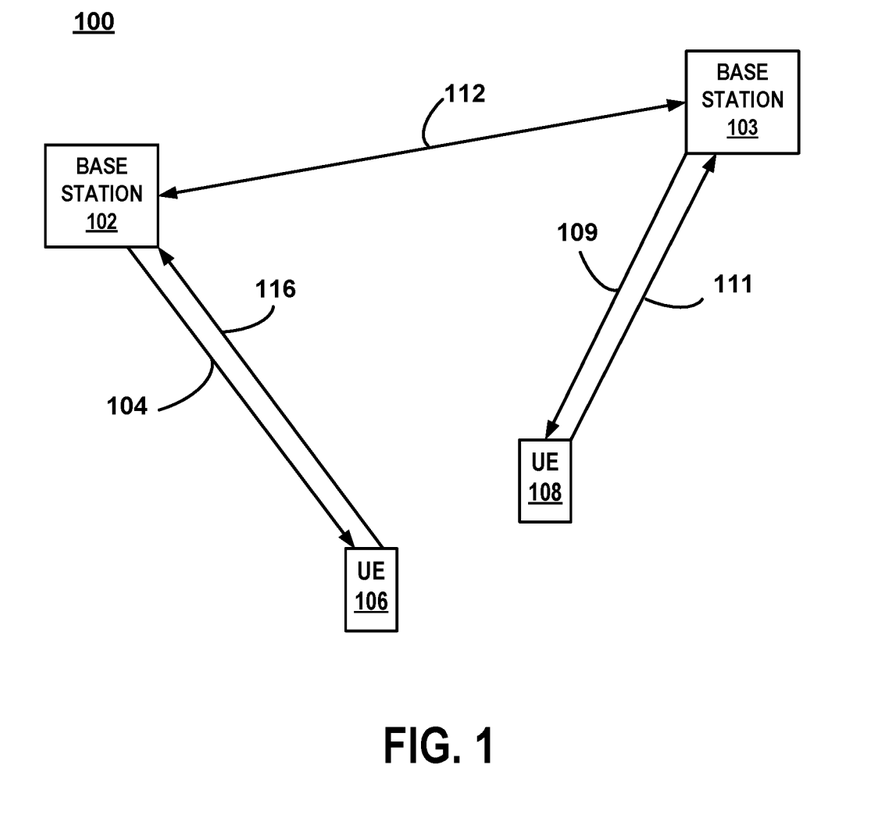
FIG. 1 is a block diagram of a communication system for an example in which a first user equipment (UE) device transmits a bitrate query to a base station serving the first UE device.

FIG. 1 is a block diagram of a communication system for an example in which a first user equipment (UE) device transmits a bitrate query to a base station serving the first UE device. The communication system 100 is part of a radio access network (not shown) that provides various wireless services to UE devices that are located within the respective service areas of the various base stations that are part of the radio access network. The base station 102 provides wireless services to UE device 106 via downlink signals 104.

In the interest of clarity and brevity, communication system 100 is shown as having only two base stations 102, 103. Initially, first base station 102 provides wireless services to UE device 106, and second base station 103 provides wireless services to UE device 108. However, in other examples, communication system 100 could have any suitable number of base stations. Base stations 102, 103, which are sometimes referred to as an eNodeB or eNB, communicate with the wireless user equipment (UE) devices 106, 108 by transmitting downlink signals 104, 109 to the UE devices 106, 108, respectively. Base stations 102, 103 receive uplink signals 116, 111 transmitted from the UE devices 106, 108, respectively. The UE devices 106, 108 are any wireless communication devices such as mobile phones, transceiver modems, personal digital assistants (PDAs), and tablets, for example.

Figure 2A:
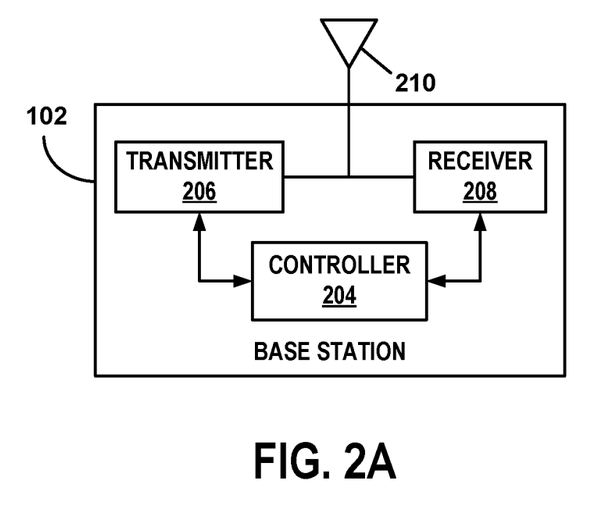
FIG. 2A is a block diagram of an example of the base stations shown in FIG. 1.

Base stations 102, 103 are connected to the network through a backhaul (not shown) in accordance with known techniques. As shown in FIG. 2A, base station 102 comprises controller 204, transmitter 206, and receiver 208, as well as other electronics, hardware, and code. Although FIG. 2A specifically depicts the circuitry and configuration of first base station 102, the same base station circuitry and configuration is utilized for second base station 103. The base station 102 is any fixed, mobile, or portable equipment that performs the functions described herein. The various functions and operations of the blocks described with reference to the base station 102 may be implemented in any number of devices, circuits, or elements. Two or more of the functional blocks may be integrated in a single device, and the functions described as performed in any single device may be implemented over several devices.

For the example shown in FIG. 2A, the base station 102 may be a fixed device or apparatus that is installed at a particular location at the time of system deployment. Examples of such equipment include fixed base stations or fixed transceiver stations. In some situations, the base station 102 may be mobile equipment that is temporarily installed at a particular location. Some examples of such equipment include mobile transceiver stations that may include power generating equipment such as electric generators, solar panels, and/or batteries. Larger and heavier versions of such equipment may be transported by trailer. In still other situations, the base station 102 may be a portable device that is not fixed to any particular location. Accordingly, the base station 102 may be a portable user device such as a UE device in some circumstances.

The controller 204 includes any combination of hardware, software, and/or firmware for executing the functions described herein as well as facilitating the overall functionality of the base station 102. An example of a suitable controller 204 includes code running on a microprocessor or processor arrangement connected to memory. The transmitter 206 includes electronics configured to transmit wireless signals. In some situations, the transmitter 206 may include multiple transmitters. The receiver 208 includes electronics configured to receive wireless signals. In some situations, the receiver 208 may include multiple receivers. The receiver 208 and transmitter 206 receive and transmit signals, respectively, through an antenna 210. The antenna 210 may include separate transmit and receive antennas. In some circumstances, the antenna 210 may include multiple transmit and receive antennas.

The transmitter 206 and receiver 208 in the example of FIG. 2A perform radio frequency (RF) processing including modulation and demodulation. The receiver 208, therefore, may include components such as low noise amplifiers (LNAs) and filters. The transmitter 206 may include filters and amplifiers. Other components may include isolators, matching circuits, and other RF components. These components in combination or cooperation with other components perform the base station functions. The required components may depend on the particular functionality required by the base station.

The transmitter 206 includes a modulator (not shown), and the receiver 208 includes a demodulator (not shown). The modulator modulates the signals to be transmitted as part of the downlink signals 104 and can apply any one of a plurality of modulation orders. The demodulator demodulates any signals, including uplink signals 116, received at the base station 102 in accordance with one of a plurality of modulation orders.

Figure 2B:
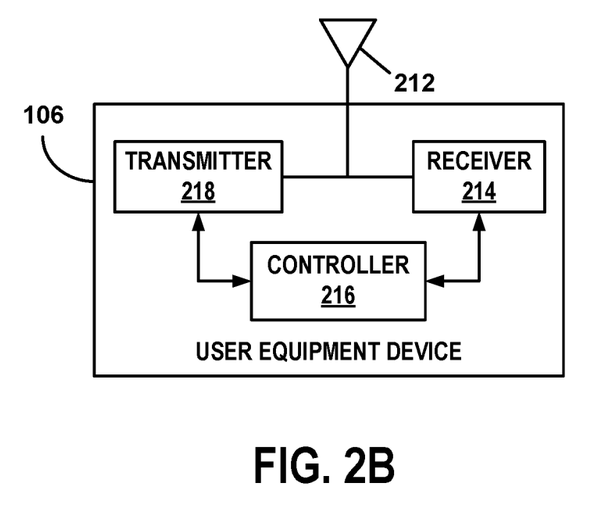
FIG. 2B is a block diagram of an example of the UE devices shown in FIG. 1.

Returning to FIG. 1, the communication system 100 provides various wireless services to the UE devices 106, 108 via base stations 102, 103, respectively. For the examples herein, the communication system 100 operates in accordance with at least one revision of the 3rd Generation Partnership Project Long Term Evolution (3GPP LTE) communication specification. A first UE device 106 receives downlink signal 104 via antenna 212 and receiver 214, as shown in FIG. 2B. Although FIG. 2B specifically depicts the circuitry and configuration of first UE device 106, the same UE device circuitry and configuration is utilized for second UE device 108. Besides antenna 212 and receiver 214, the first UE device 106 further comprises controller 216 and transmitter 218, as well as other electronics, hardware, and code. The first UE device 106 is any fixed, mobile, or portable equipment that performs the functions described herein. The various functions and operations of the blocks described with reference to the first UE device 106 may be implemented in any number of devices, circuits, or elements. Two or more of the functional blocks may be integrated in a single device, and the functions described as performed in any single device may be implemented over several devices.

The controller 216 includes any combination of hardware, software, and/or firmware for executing the functions described herein as well as facilitating the overall functionality of a UE device. An example of a suitable controller 216 includes code running on a microprocessor or processor arrangement connected to memory. The transmitter 218 includes electronics configured to transmit wireless signals. In some situations, the transmitter 218 may include multiple transmitters. The receiver 214 includes electronics configured to receive wireless signals. In some situations, the receiver 214 may include multiple receivers. The receiver 214 and transmitter 218 receive and transmit signals, respectively, through antenna 212. The antenna 212 may include separate transmit and receive antennas. In some circumstances, the antenna 212 may include multiple transmit and receive antennas.

The transmitter 218 and receiver 214 in the example of FIG. 2B perform radio frequency (RF) processing including modulation and demodulation. The receiver 214, therefore, may include components such as low noise amplifiers (LNAs) and filters. The transmitter 218 may include filters and amplifiers. Other components may include isolators, matching circuits, and other RF components. These components in combination or cooperation with other components perform the UE device functions. The required components may depend on the particular functionality required by the UE device.

The transmitter 218 includes a modulator (not shown), and the receiver 214 includes a demodulator (not shown). The modulator can apply any one of a plurality of modulation orders to modulate the signals to be transmitted as part of the uplink signals 116, which are shown in FIG. 1. The demodulator demodulates the downlink signals 104 in accordance with one of a plurality of modulation orders.

For the purposes of the examples described herein, it is assumed that base stations 102, 103 are agnostic to codec rate information. Thus, the base station 102 is not aware of which bitrates match with the codec rates available to the UE devices 106, 108 in the application layer. Therefore, the base station 102 must be informed regarding which bitrates are appropriate to recommend to the UE device 106; for purposes of rate adaptation, this is an important detail since the UE device 106 cannot autonomously decide which bitrate to use without permission from the base station 102.

In operation, there are several different options for the UE device 106 to provide feedback information to its serving base station 102 so that the base station 102 can determine a bitrate to recommend to the UE device 106. In the first option, the UE device 106 transmits, via transmitter 218 and antenna 212, a bitrate query to the base station 102. The bitrate query in this first option is merely a request that the base station 102 permits a rate increase or decrease for a specific communication link. For example, the bitrate query in this first option comprises one of the following: a request for a higher uplink bitrate, a request for a lower uplink bitrate, a request for a higher downlink bitrate, and a request for a lower downlink bitrate.

The base station 102 has discretion in determining the extent to which the UE device 106 may be granted a rate increase or decrease. In the case of a rate increase, the base station 102 is configured to recommend one of the following: any bitrate that is higher than the current bitrate being implemented by the UE device 106, and any increased bitrate that is equal to or less than a Maximum Bit Rate (MBR) that may be allocated to the UE device 106. In the case of a rate decrease, the base station 102 is configured to recommend one of the following: any bitrate that is lower than the current bitrate being implemented by the UE device 106, and any decreased bitrate that is equal to or greater than a Guaranteed Bit Rate (GBR) associated with data traffic being transmitted by and/or to UE device 106. Of course, in other examples, the base station 102 may be configured to determine different bitrates to recommend in response to a query for a rate increase or a rate decrease.

In the second option, the UE device 106 transmits, via transmitter 218 and antenna 212, a bitrate query to the base station 102. The bitrate query in this second option is a request for a specific rate based on a rate negotiation request from a second UE device 108. As mentioned above, since the base station 102 is codec rate agnostic, the rate request will be a request for a specific bitrate rather than for a specific codec rate. For example, the bitrate query in this second option comprises one of the following: a request for a specific higher uplink bitrate, a request for a specific lower uplink bitrate, a request for a specific higher downlink bitrate, and a request for a specific lower downlink bitrate. In the case of a request for a rate increase, one advantage of the second option is that the base station 102 will not allocate additional resources beyond the specific rate that is being requested by the UE device 106. Another advantage of the second option is that, if the base station 102 recommends the specific bitrate requested by the UE device 106, it is less likely to trigger a Session Description Protocol (SDP) re-negotiation of the rate with the second UE device 108.

In the third option, controller 216 of the UE device 106 determines if the difference between a current bitrate and a desired bitrate exceeds a threshold amount, and if so, the first UE device 106 transmits a bitrate query comprising a Buffer Status Report (BSR) to the base station 102. A UE device 106 transmits a BSR to the network (e.g., base station 102) to indicate how much data is in the UE device 106 buffer waiting to be transmitted. In response to receiving the BSR, the network allocates the uplink resources required for the UE device 106 to transmit the data in the UE device 106 buffer. Thus, if an increase in the uplink bitrate is needed, the UE device 106 will transmit a BSR including a value corresponding to a buffer size that is larger than a previously reported BSR. Conversely, if a decrease in the uplink bitrate is desired, the UE device 106 will transmit a BSR including a value corresponding to a small buffer size (BS). In some examples where a decrease in uplink bitrate is desired, the value of the BS will be set to zero (e.g., BS=0). Depending on base station configuration, the base station 102 may have the option to increase or decrease the uplink bitrate recommendation to the UE device 106.

Since transmission of the bitrate query is triggered by the application layer (e.g., due to an SDP re-negotiation) in the third option, the system should be configured so that the base station 102 can control how often the UE device 106 transmits the bitrate query. This can be accomplished in two different ways.

The first way to control transmission of the bitrate query is to use a timer to limit the frequency with which the UE device 106 is allowed to transmit bitrate queries to the base station 102. More specifically, the base station 102 configures a timer that begins when the UE device 106 transmits a bitrate query to the base station 102. The UE device 106 is prohibited from transmitting another bitrate query to the base station 102 until a predetermined amount of time has elapsed (e.g., until the timer expires).

The second way to control transmission of the bitrate query is to configure the UE device 106 to refrain, after transmitting the bitrate query, from transmitting another bitrate query until the difference between the current bitrate and the desired bitrate exceeds a threshold amount. More specifically, the base station 102 can implement a threshold amount based on the size of the requested bitrate change. Thus, if network conditions suggest that smaller bitrate changes are desirable, the base station 102 sets a low threshold amount so that the UE device 106 can transmit bitrate queries when the difference between the current bitrate and the desired bitrate is small. However, if network conditions suggest that smaller bitrate changes are not desirable, the base station 102 sets a higher threshold amount so that the UE device 106 can transmit bitrate queries when the difference between the current bitrate and the desired bitrate is large.

In addition to the feedback options described above, there are scenarios in which the system is configured to initiate the rate adaptation process due to changes in radio condition. In contrast to the case of network congestion, the base station 102 will need to know the radio condition of the UE device 106 to determine which bitrate to recommend. Thus, in these examples, the bitrate query is based, at least partially, on the radio condition of the UE device 106.

For example, the base station 102 transmits, via dedicated signaling or broadcast transmission, a list of recommended bitrates that correspond to a list of radio conditions. More specifically, the base station 102 transmits a mapping, which includes a set of recommended bitrates that are each associated with a set of radio conditions. Thus, in one example, the UE device 106 reports its radio condition to the base station 102 when its radio condition has changed sufficiently to correspond with a different recommended bitrate, according to the bitrate-to-radio condition mapping transmitted by the base station 102.

In other examples, the controller 216 of the UE device 106 determines that the radio condition of the first UE device 106 deviates from a reference level by a threshold amount. In some examples, the radio condition is a Reference Signals Received Power (RSRP) level measured by the UE device 106, and the reference RSRP level is the RSRP level measured when either (1) the UE device 106 last received the recommended bit rate, or (2) the UE device 106 last reported its radio condition to the base station 102. Thus, the UE device 106 would need to be configured to store the reference RSRP level in order to compare the measured RSRP level to the currently stored reference RSRP level. In response to determining that the radio condition of the first UE device 106 deviates from a reference level by a threshold amount, the UE device 106 transmits the bitrate query via transmitter 218 and antenna 212.

Since the radio condition of the second UE device 108 must be taken into account when selecting which rate to use for the VoLTE call between the first UE device 106 and the second UE device 108, the final rate requested by the first UE device 106 will be based on the rate that corresponds with the worse of the respective radio conditions of the first and second UE devices 106, 108. Moreover, the base station 102 cannot configure the recommended rate per UE device. Thus, any changes to the mappings must be updated at System Information boundaries.

Figure 3:
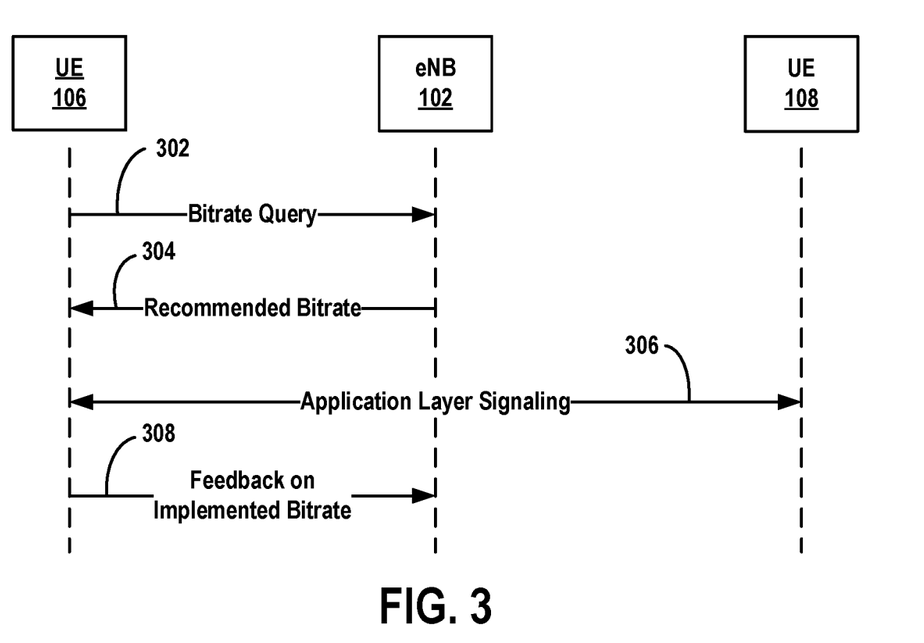
FIG. 3 is a messaging diagram of an example in which a base station provides a recommended bitrate to a UE device.

Regardless of which bitrate query option is used, the UE device 106 transmits, via transmitter 218 and antenna 212, the bitrate query to the base station 102. The base station 102 receives the bitrate query via antenna 210 and receiver 208. The bitrate query is represented in FIG. 3 by signal 302.

In response to receiving the bitrate query from the UE device 106, the base station 102 utilizes controller 204 to determine a bitrate to recommend to the UE device 106. The recommended bitrate takes into account, among other factors, the received bitrate query, the radio condition of the first UE device 106, and the current level of network congestion measured by the base station 102. Of course, any other suitable criteria may be used by the base station 102 in selecting a recommended bitrate. In some cases, the recommended bitrate is a bitrate supported by the base station 102. The bitrate recommendation, in some examples, is a recommendation for a higher rate. In other examples, the bitrate recommendation is a recommendation for a lower rate.

After determining which bitrate to recommend to the UE device 106, the base station 102 transmits, via transmitter 206 and antenna 210, a recommended bitrate to be used for a Voice over Long-Term Evolution (VoLTE) call between the first UE device 106 and a second UE device 108. The UE device 106 receives the recommended bitrate via antenna 212 and receiver 214. The recommended bitrate is represented in FIG. 3 by signal 304.

In response to receiving the recommended bitrate, the controller 216 of first UE device 106 determines whether to (1) implement (e.g., accept) the recommended bitrate, (2) reject the recommended bitrate, (3) request a different bitrate than the recommended bitrate, (4) negotiate the bitrate with second UE device 108, or (5) perform any combination of two or more of the foregoing options. If the UE device 106 chooses to initiate a bitrate negotiation with the second UE device 108 to determine a bitrate to be used for the VoLTE call between the first and second UE devices 106, 108, the first UE device 106 and the second UE device 108 use their respective transmitters 218, controllers 216, and antennas 212 to negotiate the bitrate via the application layer. This bitrate negotiation occurs via communication link 112 in FIG. 1 and is represented in FIG. 3 by Application Layer Signaling 306. In other examples, the first UE device 106 may already know which bitrate the second UE device 108 is capable of using for the VoLTE call, and thus, no negotiation is required.

Once the bitrate negotiation between the first and second UE devices 106, 108 concludes, or is skipped, the first and second UE devices 106, 108 implement a bitrate for the VoLTE call. After implementing the bitrate, the first UE device 106 transmits, using transmitter 218 and antenna 212, a feedback signal to the base station 102, indicating which rate was implemented for the VoLTE call between the first and second UE devices 106, 108. Base station 102 receives the feedback signal via antenna 210 and receiver 208. The feedback signal is represented in FIG. 3 by signal 308.

FIG. 3 is a messaging diagram of an example in which a base station provides a recommended bitrate to a UE device. In this example, the UE device 106 transmits, via transmitter 218 and antenna 212, the bitrate query to the base station 102. The bitrate query is represented in FIG. 3 by signal 302. As described above, the bitrate query may be a request that the base station 102 permits a rate increase or decrease for a specific communication link. In other examples, the bitrate query is a request for a specific bitrate. In still other examples, the bitrate query comprises a Buffer Status Report. In further examples, the bitrate query is based, at least partially, on the radio condition of the UE device 106.

The base station 102 receives the bitrate query via antenna 210 and receiver 208. As described above, the base station 102 determines a recommended bitrate based on any number of suitable factors. After determining which bitrate to recommend to the UE device 106, the base station 102 transmits, via transmitter 206 and antenna 210, a recommended bitrate to be used for a Voice over Long-Term Evolution (VoLTE) call between the first UE device 106 and a second UE device 108. The UE device 106 receives the recommended bitrate via antenna 212 and receiver 214. The recommended bitrate is represented in FIG. 3 by signal 304.

After receiving the recommended bitrate, the UE device 106 may elect to initiate a bitrate negotiation with the second UE device 108 to determine a bitrate to be used for the VoLTE call between the first and second UE devices 106, 108. This bitrate negotiation, if it occurs, is represented in FIG. 3 by Application Layer Signaling 306. After conducting, or skipping, the rate negotiation, the first UE device 106 implements a bitrate for the VoLTE call. After implementing the rate, the first UE device 106 transmits a feedback signal to the base station 102, indicating which rate was implemented for the VoLTE call between the first and second UE devices 106, 108. The feedback signal is represented in FIG. 3 by signal 308.

Figure 4:
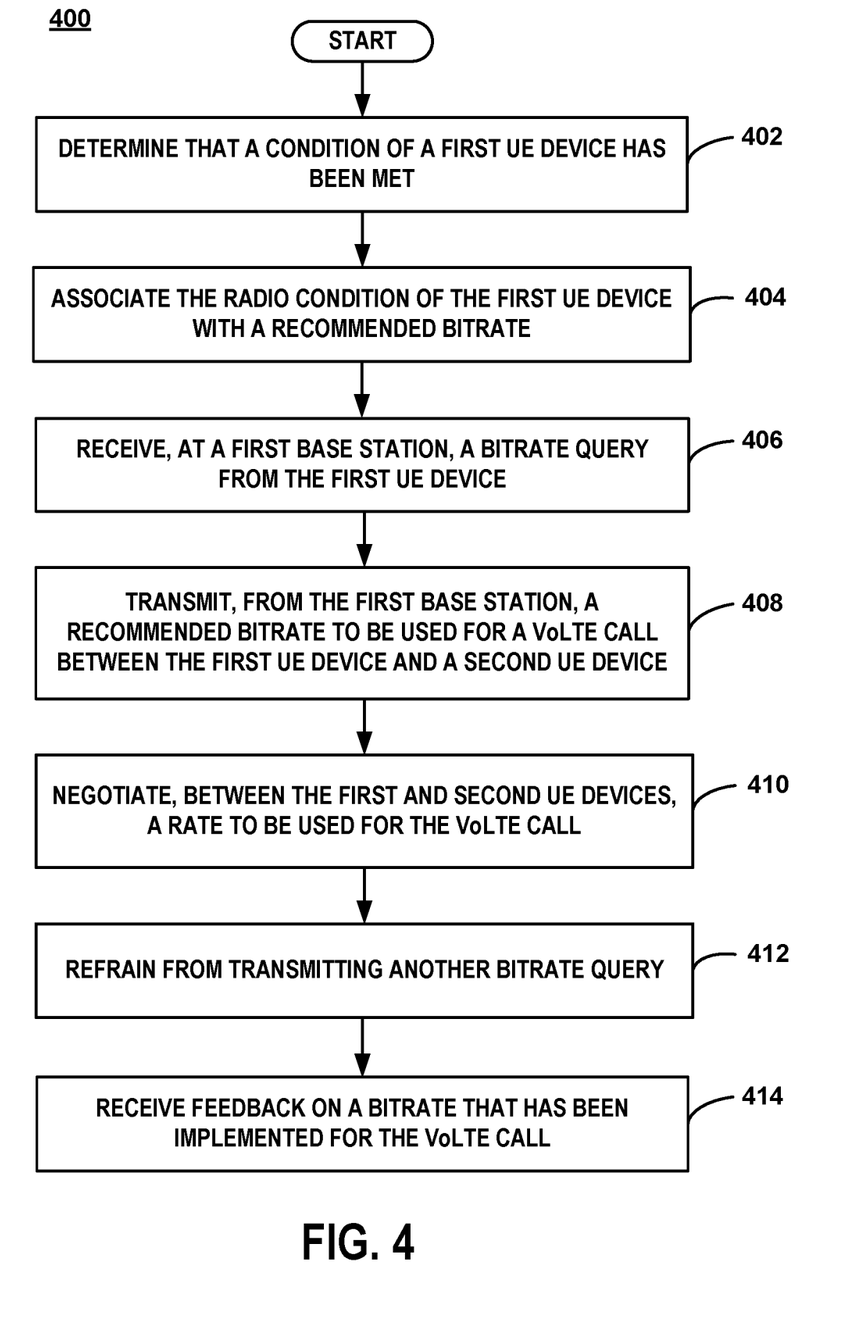
FIG. 4 is a flowchart of an example of a method in which a first user equipment (UE) device transmits a bitrate query to a base station serving the first UE device.

FIG. 4 is a flowchart of an example of a method in which a first user equipment (UE) device transmits a bitrate query to a base station serving the first UE device. The steps of method 400 may be performed in a different order than described herein and shown in the example of FIG. 4. Furthermore, in some examples, one or more of the steps may be omitted. Moreover, in other examples, one or more additional steps may be added.

In the example shown in FIG. 4, the method 400 begins at step 402, in which UE device 106 determines that a condition of the UE device 106 has been met. In one example, the condition is that the radio condition (e.g., a measured Reference Signals Received Power (RSRP) level) of the first UE device 106 deviates from a reference level (e.g., a reference RSRP level) by a threshold amount. In another example, the condition is that a difference between a current bitrate and a desired bitrate exceeds a threshold amount.

At step 404, the radio condition of the first UE device 106 is associated with a recommended bitrate. As described above, this association is made with a mapping, which includes a set of recommended bitrates that are each associated with a set of radio conditions.

At step 406, the UE device 106 transmits a bitrate query, which is received by the base station 102. As described above, the bitrate query can be merely a request for an increase or a decrease in the bitrate being implemented for either the uplink or the downlink communication link. In other examples, the bitrate query is a request for a specific bitrate. In still other examples, the bitrate query may include a Buffer Status Report (BSR).

At step 408, the first base station 102 transmits a recommended bitrate to be used for a Voice over Long-Term Evolution (VoLTE) call between the first UE device 106 and a second UE device 108. At step 410, the first UE device 106 and the second UE device 108 negotiate a bitrate to be used for the VoLTE call.

At step 412, in one example, after transmitting the bitrate query, the first UE device 106 refrains from transmitting another bitrate query until a difference between a current bitrate and a desired bitrate exceeds a threshold amount. In another example, after receiving the bitrate query, the base station 102 prohibits the first UE device 106 from transmitting another bitrate query until a predetermined amount of time has elapsed.

At step 414, the base station 102 receives feedback, from the first UE device 106, on a bitrate implemented for the VoLTE call.

Clearly, other embodiments and modifications of this invention will occur readily to those of ordinary skill in the art in view of these teachings. The above description is illustrative and not restrictive. This invention is to be limited only by the following claims, which include all such embodiments and modifications when viewed in conjunction with the above specification and accompanying drawings. The scope of the invention should, therefore, be determined not with reference to the above description, but instead should be determined with reference to the appended claims along with their full scope of equivalents.

The invention claimed is:

1. A method comprising:
receiving, at a first base station, a bitrate query from a first user equipment (UE) device being served by the first base station;
transmitting, from the first base station, a recommended bitrate, the recommended bitrate to be used for a Voice over Long-Term Evolution (VoLTE) call between the first UE device and a second UE device; and
receiving, from the first UE device, feedback on a bitrate implemented for the VoLTE call.

2. The method of claim 1, wherein the bitrate query is based at least partially on a radio condition of the first UE device.

3. The method of claim 2, further comprising:
determining that the radio condition of the first UE device deviates from a reference level by a threshold amount; and
transmitting the bitrate query.

4. The method of claim 3, wherein the radio condition comprises a measured Reference Signals Received Power (RSRP) level, and the reference level comprises a reference RSRP level.

5. The method of claim 2, further comprising:
associating the radio condition of the first UE device with a recommended bitrate.

6. The method of claim 1, further comprising:
determining that a difference between a current bitrate and a desired bitrate exceeds a threshold amount; and
transmitting, from the first UE device, a bitrate query comprising a Buffer Status Report (BSR) to the first base station.

7. The method of claim 1, further comprising:
after receiving the bitrate query, prohibiting the first UE device from transmitting another bitrate query until a predetermined amount of time has elapsed.

8. The method of claim 1, further comprising:
after transmitting the bitrate query, refraining, by the first UE device, from transmitting another bitrate query until a difference between a current bitrate and a desired bitrate exceeds a threshold amount.

9. A system comprising:
a first user equipment (UE) device; and
a first base station serving the first UE device, the first base station comprising:
a receiver configured to receive a bitrate query from the first UE device, and
a transmitter configured to transmit a recommended bitrate, the recommended bitrate to be used for a Voice over Long-Term Evolution (VoLTE) call between the first UE device and a second UE device,
the receiver further configured to receive, from the first UE device, feedback on a bitrate implemented for the VoLTE call.

10. The system of claim 9, wherein the bitrate query is based at least partially on a radio condition of the first UE device.

11. The system of claim 10, wherein the first UE device comprises:
a controller configured to determine whether the radio condition of the first UE device deviates from a reference level by a threshold amount; and
a transmitter configured to transmit the bitrate query, if the radio condition of the first UE device deviates from the reference level by the threshold amount.

12. The system of claim 11, wherein the radio condition comprises a measured Reference Signals Received Power (RSRP) level, and the reference level comprises a reference RSRP level.

13. The system of claim 10, wherein the first UE device comprises a controller configured to associate the radio condition of the first UE device with a recommended bitrate.

14. The system of claim 9, wherein the first UE device comprises:
a controller configured to determine whether a difference between a current bitrate and a desired bitrate exceeds a threshold amount; and
a transmitter configured to transmit a bitrate query comprising a Buffer Status Report (BSR) to the first base station, if the difference between the current bitrate and the desired bitrate exceeds the threshold amount.

15. The system of claim 9, wherein the first UE device comprises:
a transmitter configured to, after transmitting the bitrate query, refrain from transmitting another bitrate query until a predetermined amount of time has elapsed.

16. A method comprising:
receiving, at a base station, a bitrate query from a first user equipment (UE) device being served by the base station;

transmitting, from the base station, a recommended bitrate to the first UE device, the recommended bitrate to be used for a Voice over Internet Protocol (VoIP) call between the first UE device and a second UE device; and prohibiting the first UE device from, after transmitting the bitrate query, further transmitting a bitrate query to the base station until a timer has expired, the timer configured to the first UE device by the base station.

17. The method of claim 1, wherein the VoIP call is a Voice over Long-Term Evolution (VoLTE) call.

18. The method of claim 1, wherein the recommended bitrate is equal to or less than a Maximum Bit Rate (MBR) and equal to or greater than a Guaranteed Bit Rate (GBR).

19. A user equipment (UE) device comprising:

a transmitter configured to transmit a bitrate query to a base station serving the UE device;

a receiver configured to receive a recommended bitrate from the base station, the recommended bitrate to be used for a Voice Internet Protocol (VoIP) call between the UE device and another UE device; and a controller configured to prohibit from, after transmitting the bitrate query, further transmitting a bitrate query until a timer has expired, the timer configured to the UE device by the base station.

20. A base station comprising:

a receiver configured to receive a bitrate query from a first user equipment (UE) device being served by the base station;

a transmitter configured to transmit a recommended bitrate to the first UE device, the recommended bitrate to be used for a Voice over Internet Protocol (VoIP) call between the first UE device and a second UE device; and a controller configured to configure, to the first UE, a timer to prohibit the first UE device from, after the first UE device transmitting the bitrate query, further transmitting a bitrate query to the base station until the time expires.

21. A processor for an user equipment (UE) device comprising:

a memory configured to store at least a program, wherein the at least a program comprising:

a first process to make the UE device transmit a bitrate query to a base station serving the UE device;

a second process to make the UE device receive a recommended bitrate from the base station, the recommended bitrate to be used for a Voice Internet Protocol (VoIP) call between the UE device and another UE device; and a third process to make the UE device prohibit from, since transmitting the bitrate query, further transmitting a bitrate query until a timer has expired, the timer configured to the UE device by the base station.

* * * * *